United States Patent
Zhang et al.

(10) Patent No.: US 10,053,056 B1
(45) Date of Patent: Aug. 21, 2018

(54) MULTI-STEP VEHICLE ENTRY AUTHORIZATION

(71) Applicants: Denso International America, Inc., Southfield, MI (US); DENSO CORPORATION, Kariya, Aichi-pref. (JP)

(72) Inventors: Yu Zhang, Farmington Hills, MI (US); Vikas Upmanue, Farmington Hills, MI (US); Gerti Tuzi, Clawson, MI (US); Bilal Alasry, Dearborn, MI (US); Scott Walenty, Farmington Hills, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/492,131

(22) Filed: Apr. 20, 2017

(51) Int. Cl.
    *B60R 25/25* (2013.01)
(52) U.S. Cl.
    CPC ................. *B60R 25/25* (2013.01)
(58) Field of Classification Search
    None
    See application file for complete search history.

(56) References Cited

U.S. PATENT DOCUMENTS

| | | | | |
|---|---|---|---|---|
| 6,376,930 B1 * | 4/2002 | Nagao | ................ | G07C 9/00158 307/10.2 |
| 7,378,939 B2 * | 5/2008 | Sengupta | ................ | H04M 1/67 340/5.53 |
| 7,969,280 B2 * | 6/2011 | Slevin | ................ | G07C 9/00182 340/12.23 |
| 8,994,498 B2 * | 3/2015 | Agrafioti | ................ | G06F 21/40 340/5.52 |
| 9,378,598 B2 * | 6/2016 | Dumas | ................ | G07C 9/00571 |
| 9,406,300 B2 * | 8/2016 | Himmelstein | .......... | G10L 17/22 |
| 2003/0169909 A1 | 9/2003 | Yamagishi | | |
| 2008/0174446 A1 | 7/2008 | Ghabra et al. | | |
| 2016/0050202 A1 | 2/2016 | Swallow | | |

FOREIGN PATENT DOCUMENTS

| | | |
|---|---|---|
| CN | 103035054 A | 4/2013 |
| JP | 2001-291135 A | 10/2001 |
| JP | 2008-189261 A | 8/2008 |
| JP | 2010-146095 A | 7/2010 |
| JP | 2017-043267 A | 3/2017 |
| WO | WO-2015043842 A2 | 4/2015 |

* cited by examiner

*Primary Examiner* — K. Wong
(74) *Attorney, Agent, or Firm* — Harness, Dickey & Pierce, P.L.C.

(57) ABSTRACT

Systems and methods for multi-step vehicle entry authorization utilizing biometric data are disclosed. A proximity/contact sensor attached to a vehicle receives a device ID from a wearable device of a user. A biometric sensor receives biometric data of the user. A control module accesses a user database storing authorized user information and determines whether the user is authorized for the vehicle based on the device ID, the biometric data, and the user database. The control module unlocks the vehicle in response to a determination that the user is authorized for the vehicle.

20 Claims, 6 Drawing Sheets

MULTI-STEP VEHICLE ENTRY AUTHORIZATION

FIELD

The present disclosure relates to systems and methods for vehicle entry authorization and, more particularly, to systems and methods for multi-step vehicle entry authorization that utilize biometric data.

BACKGROUND

This section provides background information related to the present disclosure, which is not necessarily prior art.

Key fobs are generally used to remotely unlock a vehicle. For example, a user in the vicinity of a vehicle can activate a button on the key fob to unlock the vehicle. Key fobs, however, can be cumbersome for users to carry. In addition, a lost or stolen key fob can create an unsafe situation as an unauthorized stranger can potentially gain access to a vehicle.

SUMMARY

This section provides a general summary of the disclosure, and is not a comprehensive disclosure of its full scope or all of its features.

The present teachings include systems and methods for multi-step vehicle entry authorization utilizing biometric data. In one or more implementations, the system includes a proximity/contact sensor attached to a vehicle that receives a device ID from a wearable device of a user, a biometric sensor that receives biometric data of the user, and a control module. The control module accesses a user database storing authorized user information and determines whether the user is authorized for the vehicle based on the device ID, the biometric data, and the user database. The control module unlocks the vehicle in response to a determination that the user is authorized for the vehicle.

In other features, a method is provided and includes receiving, with a proximity/contact sensor attached to a vehicle, a device ID from a wearable device of a user. The method also includes receiving, with a biometric sensor, biometric data of the user. The method also includes accessing, with a control module, a user database storing authorized user information. The method also includes determining, with the control module, whether the user is authorized for the vehicle based on the device ID, the biometric data, and the user database. The method also includes unlocking, with the control module, the vehicle in response to a determination that the user is authorized for the vehicle.

In one or more implementations, the system includes a proximity/contact sensor attached to a vehicle that receives a device ID from a computing device of a user, the computing device being one of a smartphone and embedded in the user. A biometric sensor that receives biometric data of the user. A control module that accesses a user database storing authorized user information and determines whether the user is authorized for the vehicle based on the device ID, the biometric data, and the user database. The control module unlocks the vehicle in response to a determination that the user is authorized for the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To address the above issues with traditional key fobs, the present teachings include systems and methods for multi-step vehicle entry authorization that utilize a wearable device worn by a user and biometric data of the user. As described in further detail below, the vehicle includes a proximity/contact sensor that listens for a signal from a wearable device in the vicinity of the vehicle. If a device identification (ID) of the wearable device is authorized, the vehicle prompts the user to input biometric data via a biometric sensor, such as a fingerprint panel, a microphone for voice input, and/or a camera for iris recognition. If the biometric data inputted by the user matches with biometric data stored by the vehicle and associated with the received device ID, then the vehicle unlocks the doors of the vehicle. If the inputted biometric data does not match, the vehicle can alert a vehicle administrator, such as an owner of the vehicle or a business associated with the vehicle. If the vehicle receives a device ID that it does not recognize and the user tries to activate a door of the vehicle, the vehicle can check with a remote server to determine whether a new authorized user has been added for the vehicle. When a new authorized user has been added, the vehicle can retrieve the associated stored biometric data for the new authorized user, prompt the user to input biometric data via the biometric sensor, compare the stored biometric data with inputted biometric data from the user, and unlock the doors of the vehicle when the inputted biometric data matches the stored biometric data. As discussed in further detail below, the biometric sensor can be located on the vehicle or, alternatively, can be located on the wearable device itself.

Figure 1:
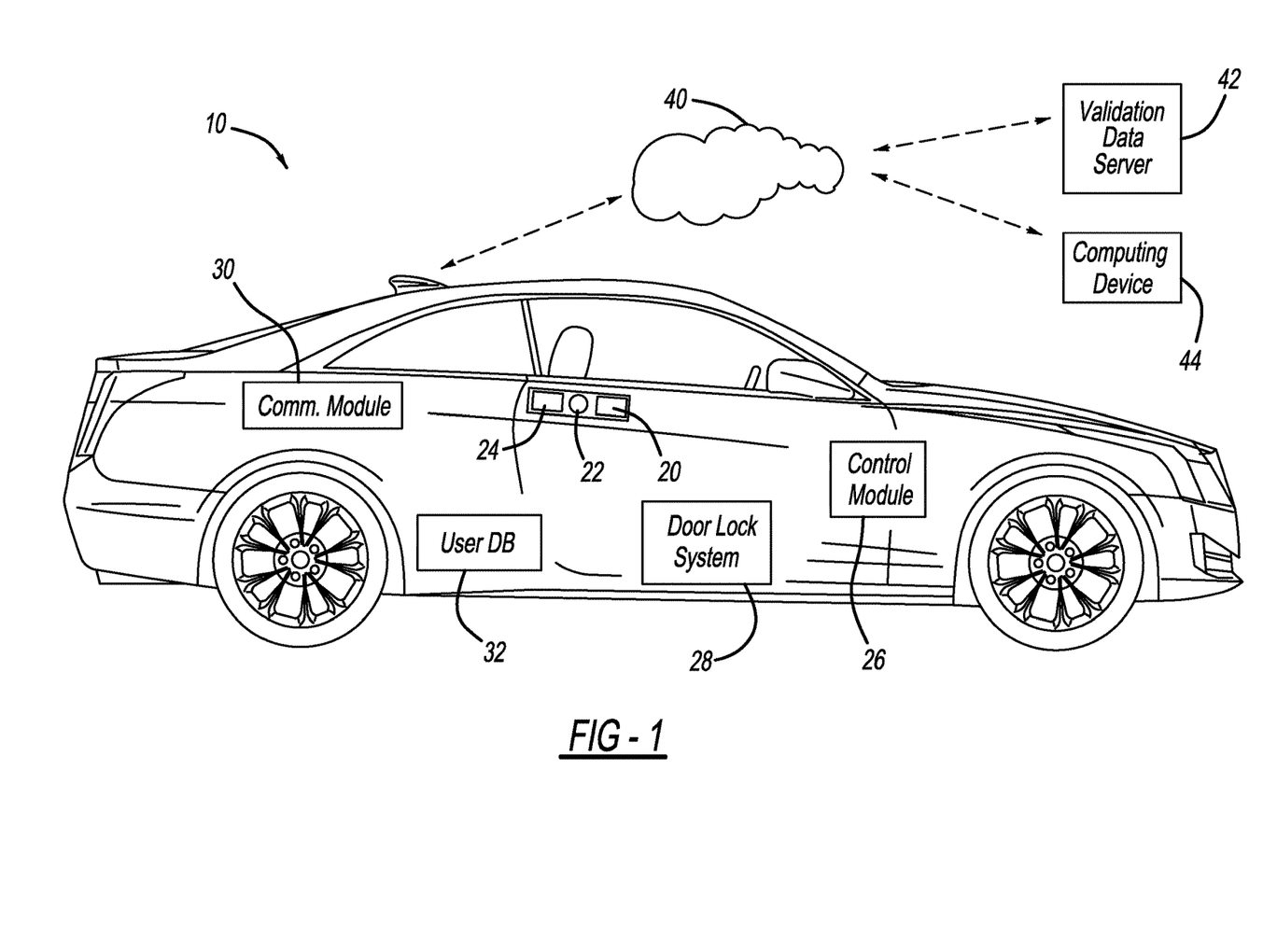
FIG. 1 illustrates a subject vehicle with a multi-step vehicle entry authorization system according to the present teachings.

With reference to FIG. 1, a subject vehicle 10 with a multi-step vehicle entry authorization is illustrated. Although the subject vehicle 10 is illustrated as an automobile in FIG. 1, the present teachings apply to any other suitable vehicle, such as a sport utility vehicle (SUV), a mass transit vehicle (such as a bus), or a military vehicle, as examples.

The subject vehicle 10 includes a biometric sensor 20 that receives biometric data inputted by a user of the subject vehicle 10. For example, the biometric sensor 20 can include a fingerprint panel that receives a fingerprint of a user. Alternatively, the biometric sensor 20 can include a microphone that receives voice input from the user. Alternatively, the biometric sensor 20 can include an image sensor or camera that receives image data of an iris of the user. While the biometric sensor 20 is shown in FIG. 1 as being located on a door panel of the subject vehicle 10, the biometric sensor 20 can be located at any applicable or convenient location on the subject vehicle 10 to allow user access to the biometric sensor 20. For example, the biometric sensor 20 illustrated in FIG. 1 includes a fingerprint panel to receive a fingerprint of a user and is located on the door of the vehicle to align with a hand of the user, as shown, for example, in FIGS. 4 and 5. Alternatively, if the biometric sensor 20 includes, for example, a microphone for voice input or an image sensor or camera for iris image input, the biometric sensor 20 can be located higher on the vehicle to align more closely with a head of the user.

The biometric sensor 20 can include a backlight, such as a Light Emitting Diode (LED) light, to prompt a user to input biometric data to the biometric sensor 20. Alternatively, the biometric sensor 20 can be configured with a light-up frame, including an LED light and a light pipe surrounding the biometric sensor. Additionally or alternatively, the subject vehicle 10 can include a speaker 22, such as an external speaker mounted on the subject vehicle 10, to issue audio voice commands prompting the user to input biometric data to the biometric sensor 20, as discussed in further detail below. If a speaker 22 is used, the speaker 22 can be located at any convenient location on the vehicle to provide audio voice commands to the user of the subject vehicle 10.

The subject vehicle 10 can include a proximity/contact sensor 24. The proximity/contact sensor 24, for example, may listen for a wireless signal that is broadcast from a wearable device 50, 51 (shown in FIGS. 2 to 5). The proximity/contact sensor 24 and the wearable device 50, 51, for example, can communicate using a wireless communication protocol suitable for communication over short distances, such as, for example, BLUETOOTH®, Bluetooth Low Energy (also referred to as BLUETOOTH SMART®), a Near Field Communication protocol, or any other suitable wireless communication protocol. As discussed in further detail below, the proximity/contact sensor 24 can listen for a signal from the wearable device 50, 51 and can receive a device ID of the wearable device 50, 51.

The subject vehicle 10 also includes a control module 26 in communication with the biometric sensor 20 and the proximity/contact sensor 24. The control module 26, for example, receives biometric data from the biometric sensor 20 and the device ID of a wearable device 50 from the proximity/contact sensor 24. The subject vehicle 10 also includes a door lock system 28 that locks and unlocks doors of the subject vehicle 10. As discussed in further detail below, the control module 26 receives biometric data from the biometric sensor 20 and the device ID of a wearable device 50 from the proximity/contact sensor 24, and controls the door lock system 28 to lock and unlock the doors of the subject vehicle 10, in accordance with the systems and methods of the present disclosure.

The subject vehicle 10 also includes a user database 32 that stores user information, such as data associated with authorized users of the subject vehicle 10. The user database 32 is accessible to and in communication with the control module 26. For example, the user database 32 can device IDs of wearable devices 50 associated with authorized users. For further example, the user database 32 can store biometric data, such as fingerprint data, voice recognition data, and/or iris recognition data, for the authorized users of the subject vehicle 10. In this way, as discussed in further detail below, for each authorized user, the user database 32 can store a device ID of a wearable device 50 associated with the particular authorized user along with the biometric data associated with the particular authorized user. In this way, as discussed in further detail below, once the proximity/contact sensor 24 receives a device ID from a wearable device 50, the control module 26 can access the user database 32 and retrieve the applicable biometric data for the authorized user associated with the received device ID from the wearable device 50. As discussed in further detail below, the control module 26 can then receive biometric data inputted from a user via the biometric sensor 20 and determine whether the inputted biometric data matches the retrieved biometric data from the user database 32. When there is a match, the control module 26 can determine that the user is authorized and can control the door lock system 28 to unlock the doors of the subject vehicle 10.

The subject vehicle 10 also includes a communication module 30 that facilitates communication between the subject vehicle 10 and, for example, a distributed communication network 40, such as a local area network (LAN), a wireless local area network (WLAN), and/or a wide area network (WAN) such as the Internet. For example, the communication module 30 can communicate using WiFi communication, cellular network data communication, such as Long-Term Evolution (LTE), 4G LTE, 4G, 3G, or EDGE communication networks, and/or via any other suitable and available wireless communication technology. The control module 26 can utilize the communication module to communicate, through the distributed communication network 40, with a validation data server 42. For example, the control module 26 can receive updated user data from the validation data server 42 and can update the user database 32 accordingly. Further, as discussed in detail below, a user can use a computing device 44 to communicate over the distributed communication network 40 with the validation data server 42 and input and/or update user data, including a device ID of a wearable device 50 and/or associated biometric data, of an authorized user of the subject vehicle 10. The inputted and/or updated user data can then be communicated to the subject vehicle 10 and used by the control module 26 to update the user database 32.

Figure 2:
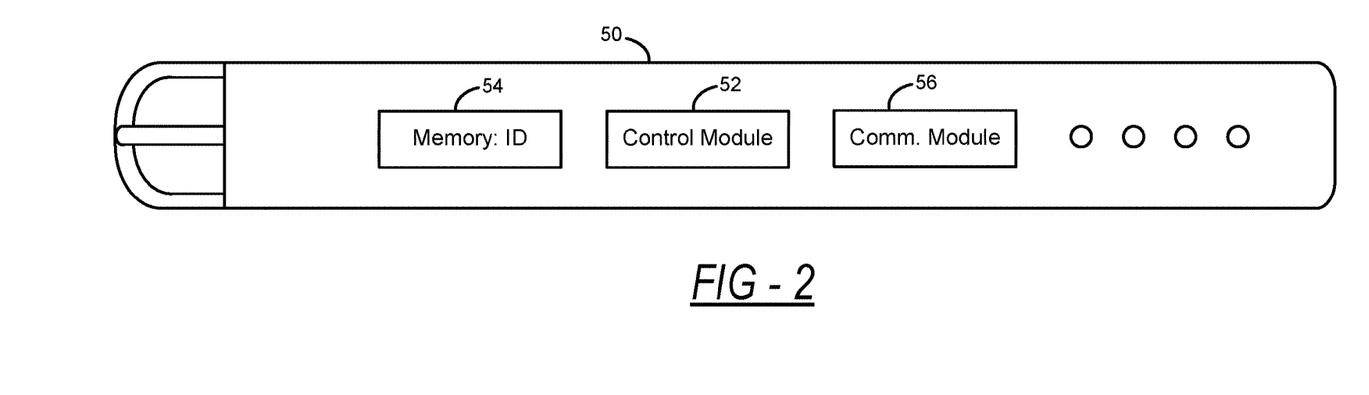
FIG. 2 illustrates a wearable device for use with a multi-step vehicle entry authorization system according to the present teachings.
Figure 4:
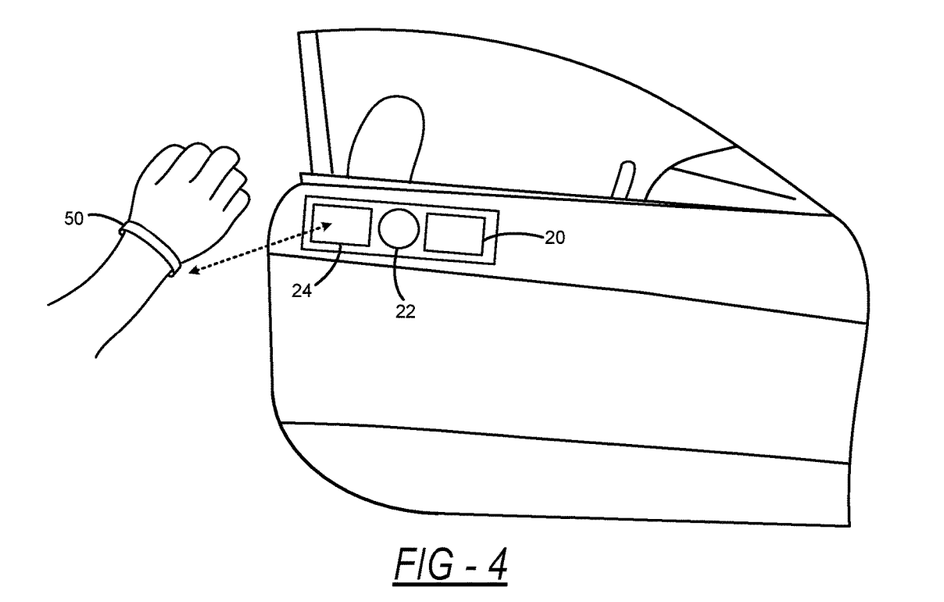
FIG. 4 is a partial view of the subject vehicle with the multi-step vehicle entry authorization system shown in FIG. 1 and a user with a wearable device according to the present teachings.
Figure 5:
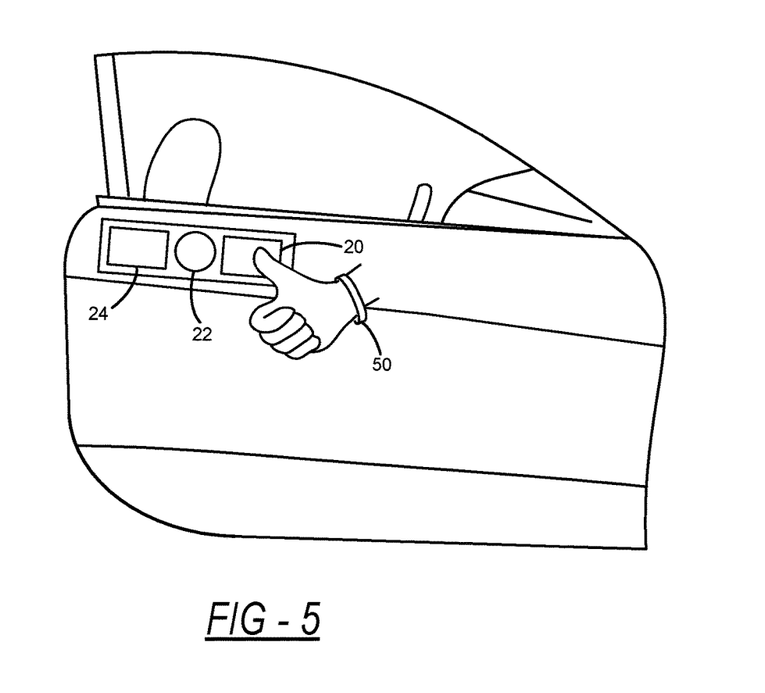
FIG. 5 is a partial view of the subject vehicle with the multi-step vehicle entry authorization system shown in FIG. 1 and a user with a wearable device according to the present teachings.

With reference to FIG. 2, a wearable device 50 for use with a multi-step vehicle entry authorization system according to the present teachings is shown. For example, as shown in FIG. 2, the wearable device 50 is configured as a bracelet to be worn around a wrist of a user, as shown in FIGS. 4 and 5. Alternatively, the wearable device 50 could be configured to be worn at other locations on the user. For example, the wearable device 50 could be configured as a necklace worn around a user's neck, an armband worn around a user's arm, an anklet worn around a user's ankle, a belt worn around a user's waist, a hat worn on a user's head, a chest band worn around a user's chest, or as another suitable wearable device worn by the user. Additionally or alternatively, the wearable device 50 can be integrated into an article of clothing worn by the user. Alternatively, instead of the wearable device 50, a computing device may be implanted within a body of the user. In such case, the implanted computing device may include the described functionality of the wearable device 50 and used with the multi-step vehicle entry authorization system according to the present teachings. Alternatively, instead of the wearable device, a portable computing device, such as a smart phone, associated with the user may be used. In such case, the portable computing device, such as the smartphone, may include the described functionality of the wearable device 50 or wearable device 51.

As shown in FIG. 2, the wearable device 50 includes a control module 52, a memory 54, and a communication module 56. The memory 54 stores, for example, the device ID of the wearable device 50. The control module 52 is in communication with the memory 54 and the communication module 56. Specifically, the control module 52 can access the device ID stored in the memory 54 and can control the communication module 56 to broadcast a wireless signal that can be received by the proximity/contact sensor 24 of the subject vehicle 10. For example, the communication module 56 of the wearable device 50 can broadcast a discovery signal that is received by the proximity/contact sensor 24 of the subject vehicle 10. Upon hearing/receiving the discovery signal, the proximity/contact sensor 24 can send a request to the communication module 56 of wearable device 50 for the device ID of the wearable device. Alternatively, the communication module 56 of the wearable device can periodically broadcast the device ID of the wearable device 50 at all times the wearable device is turned on. As noted above, communication module 56 of the wearable device 50 can communicate using, for example, a wireless communication protocol suitable for communication over short distances, such as, for example, BLUETOOTH®, Bluetooth Low Energy (also referred to as BLUETOOTH SMART®), a Near Field Communication protocol, or any other suitable wireless communication protocol.

Figure 3:
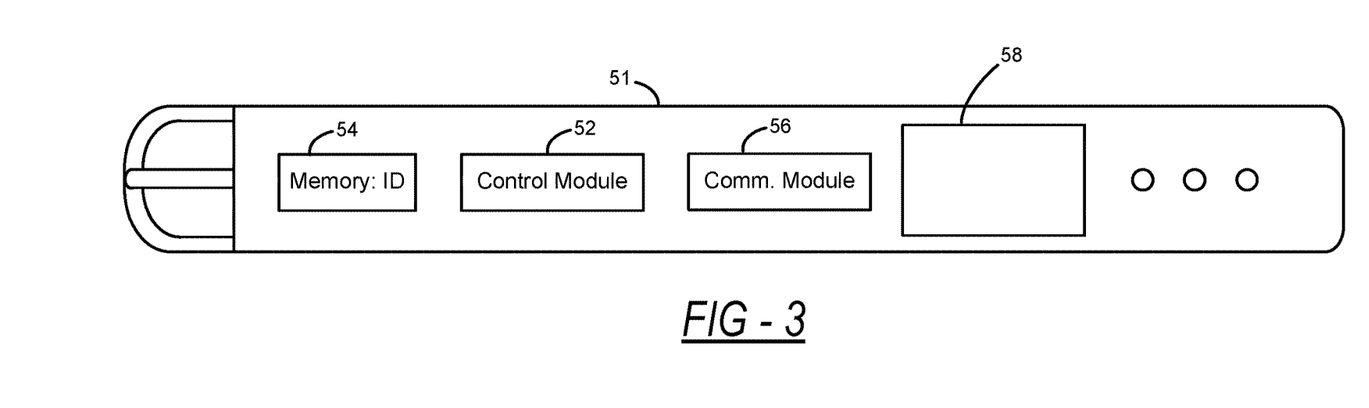
FIG. 3 illustrates another wearable device for use with a multi-step vehicle entry authorization system according to the present teachings.

With reference to FIG. 3, an alternate embodiment including a wearable device 51 for use with a multi-step vehicle entry authorization system according to the present teachings is shown. The wearable device 51 shown in FIG. 3 is identical to the wearable device 50 shown in FIG. 2, except that the wearable device 51 includes a biometric sensor 58. For example, the biometric sensor 58 can include a fingerprint panel that receives a fingerprint of a user. Alternatively, the biometric sensor 58 can include a microphone that receives voice input from the user. Alternatively, the biometric sensor 58 can include an image sensor or camera that receives image data of an iris of the user. As discussed in detail below, in this embodiment, the wearable device 51 can receive biometric data of the user via the biometric sensor 58 and can communicate the biometric data of the user to the subject vehicle 10. As discussed in further detail below with reference to FIG. 7, the control module 26 of the subject vehicle, for example, can then compare the device ID of the wearable device 51 and the biometric data inputted via the biometric sensor 58 with the device IDs and biometric data stored in the user database 32 to determine whether the device ID and biometric data received from the wearable device 51 match a device ID and biometric data of an authorized user. When there is a match, the control module 26 can determine that the user is authorized and can control the door lock system 28 to unlock the doors of the subject vehicle 10.

As shown in FIG. 4, as the wearable device 50 comes within a communication range of the proximity/contact sensor 24, the wearable device 50 communicates with the proximity/contact sensor 24, as shown by the double-headed arrow. As discussed in further detail above and below, the wearable device 50 sends the device ID of the wearable device 50 to the proximity/contact sensor 24.

As discussed in further detail below, if the device ID of the wearable device 50 corresponds to an authorized user of the subject vehicle 10, the subject vehicle 10 then prompts the user to input biometric data. For example, the control module 26 can issue voice commands to the user through the speaker 22 prompting and instructing the user to input the biometric data. Additionally or alternatively, visual indicia on the biometric sensor 20 can be activated to prompt the user to input biometric data. For example, a back light of the biometric sensor 20 or a light pipe surrounding the biometric sensor can be activated.

As shown in FIG. 5, the biometric sensor 20 can be a fingerprint panel. In FIG. 5, the user is inputting biometric data to the biometric sensor 20 by placing the user's thumb on the fingerprint panel of the biometric sensor 20. In this way, the biometric sensor 20 can read a thumbprint of the user and communicate biometric data of the user's thumbprint to the control module 26 to be compared with stored biometric data for the user associated with the device ID of the wearable device. When the inputted biometric data matches the stored biometric data, e.g., when the inputted thumbprint matches the stored thumbprint, the control module 26 of the subject vehicle 10 controls the door lock system 28 to unlock the doors of the subject vehicle 10.

Figure 6:
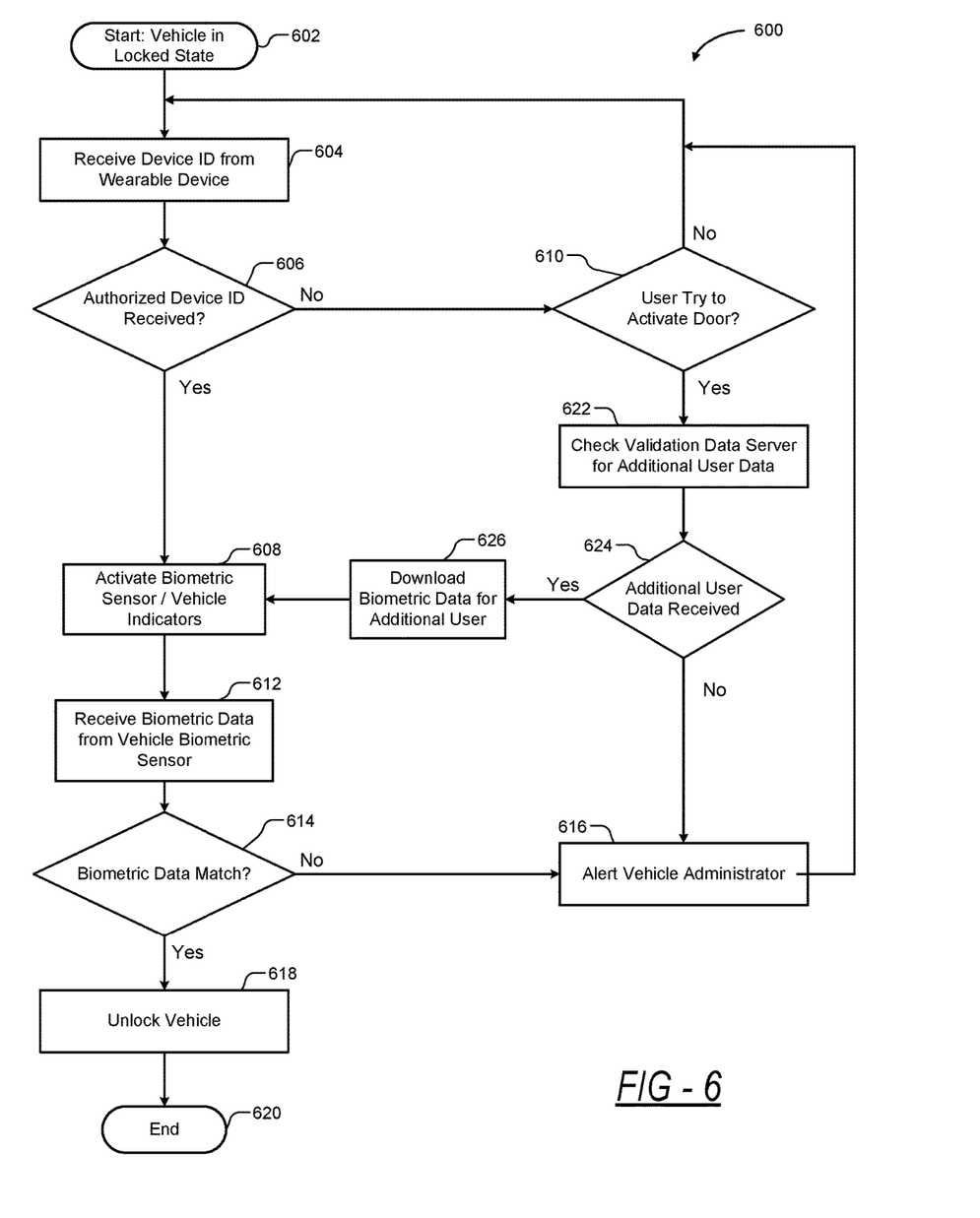
FIG. 6 illustrates a flow diagram for a method of multi-step vehicle entry authorization according to the present teachings.

With reference to FIG. 6, a flow diagram for a method of multi-step vehicle entry authorization is shown. The method or algorithm 600, for example, can be performed by the control module 26 of the subject vehicle 10. The algorithm 600 starts at 602 with the vehicle in a locked state. In other words, at 602 the door lock system 28 of the subject vehicle 10 has locked the doors of the subject vehicle 10. With the subject vehicle 10 in the locked state, the proximity/contact sensor 24 listens for a signal from a wearable device 50.

At 604, the control module 26 receives a device ID from a wearable device 50 through the proximity/contact sensor 24. At 606, the control module 26 checks the user database 32 of the subject vehicle 10 to determine whether the received device ID is associated with an authorized device, i.e., whether the device ID is stored in the user database 32 associated with authorized user information. When the device ID is authorized, the control module 26 proceeds to 608. When the device ID is not authorized, the control module 26 proceeds to 610.

At 608, the control module 26 activates the biometric sensor 20 and any associated vehicle indicators. For example, the control module 26 can turn on the biometric sensor 20 and activate a backlight or framing light of the biometric sensor 20. At 612, the control module 26 receives biometric data of the use from the biometric sensor 20 of the subject vehicle. For example, as discussed above, the biometric sensor 20 can include a fingerprint panel, in which case the control module 26 receives fingerprint data of the user at 612. Alternatively, the biometric sensor 20 can include a microphone that receives voice input from the user, in which case the control module 26 receives voice data of the user at 612. For example, the voice data may include a recording of the user speaking a predetermined word or a word that the subject vehicle 10 instructs the user to say via the speaker 22. Alternatively, the biometric sensor 20 can include an image sensor or camera that receives image data of an iris of the user, in which case the control module 26 receives image data for an iris of the user.

At 614, the control module 26 compares the biometric data received from the user via the biometric sensor 20 with biometric data in the user database 32. For example, the control module 26 can retrieve biometric data stored in the user database 32 as being associated with the previously received device ID.

At 614, when the inputted biometric data matches the stored biometric data, the control module 26 proceeds to 618 and unlocks the subject vehicle 10. For example, the control module 26 controls the door lock system 28 to unlock the doors of the subject vehicle. The algorithm then ends at 620.

At 614, when the inputted biometric data does not match the stored biometric data, the control module 26 proceeds to 616 and alerts a vehicle administrator associated with the subject vehicle 10 that an unauthorized user has attempted to enter the vehicle. For example, the vehicle administrator can be an owner of the subject vehicle 10 or a designated employee or owner of a business associated with the subject vehicle. The control module 26, for example, can alert the vehicle administrator by sending an email, a text message, and/or another suitable communication message to the vehicle administrator. After 616, the control module 26 then loops back to 604 and waits to receive another device ID from a wearable device 50.

Referring back to 606 of FIG. 6, as discussed above, the control module 26 checks the user database 32 of the subject vehicle 10 to determine whether the received device ID is associated with an authorized device, i.e., whether the device ID is stored in the user database 32 associated with authorized user information. When the device ID is not authorized, the control module 26 proceeds to 610.

At 610, the control module 26 determines whether the user tries to open/activate a door of the subject vehicle 10 after the device ID of the user's wearable device 50 is received, such as by pulling or lifting a door handle of the subject vehicle 10 or pressing a door activation button on the subject vehicle 10. Further, the control module 26 may determine whether the user tries to open/activate a door of the subject vehicle 10 within a predetermined time period, such as, for example, one minute or two minutes, after receiving the device ID. At 610, when the user does not try to open a door of the subject vehicle 10 after the device ID is received, the control module 26 loops back to 604 and waits for another device ID to be received from the proximity/contact sensor 24.

At 610, when the user does try to open a door of the subject vehicle, for example, within a predetermined time period after the device ID is received, the control module 26 proceeds to 622. At 622, the control module 26 communicates with the validation data server 42 through the communication module 30 and distributed communication network 40 to determine if additional user data is available for the subject vehicle 10. For example, an additional authorized user may have been added for the subject vehicle 10. In such case, a device ID for a wearable device and biometric data associated with the additional authorized user may be stored in the validation data server 42.

At 624, the control module 26 determines if there is additional user data available for the subject vehicle 10. If so, the control module 26 proceeds to 626 and downloads additional user data for the authorized user, including biometric data and a device ID associated with the authorized user. The control module 26 updates the user database 32 to include the additional user data. After retrieving the additional user data from the validation data server 42, the control module proceeds to 608 and activates the biometric sensor 20 and associated vehicle indicators, as discussed in detail above.

At 624 when additional user data is not available for the subject vehicle 10 in the validation data server 42, the control module 26 proceeds to 616 and alerts the vehicle administrator that an unauthorized user has attempted to enter the vehicle, as discussed in detail above. The control module 26 then loops back to 604 and waits to receive another device ID from a wearable device 50.

Figure 7:
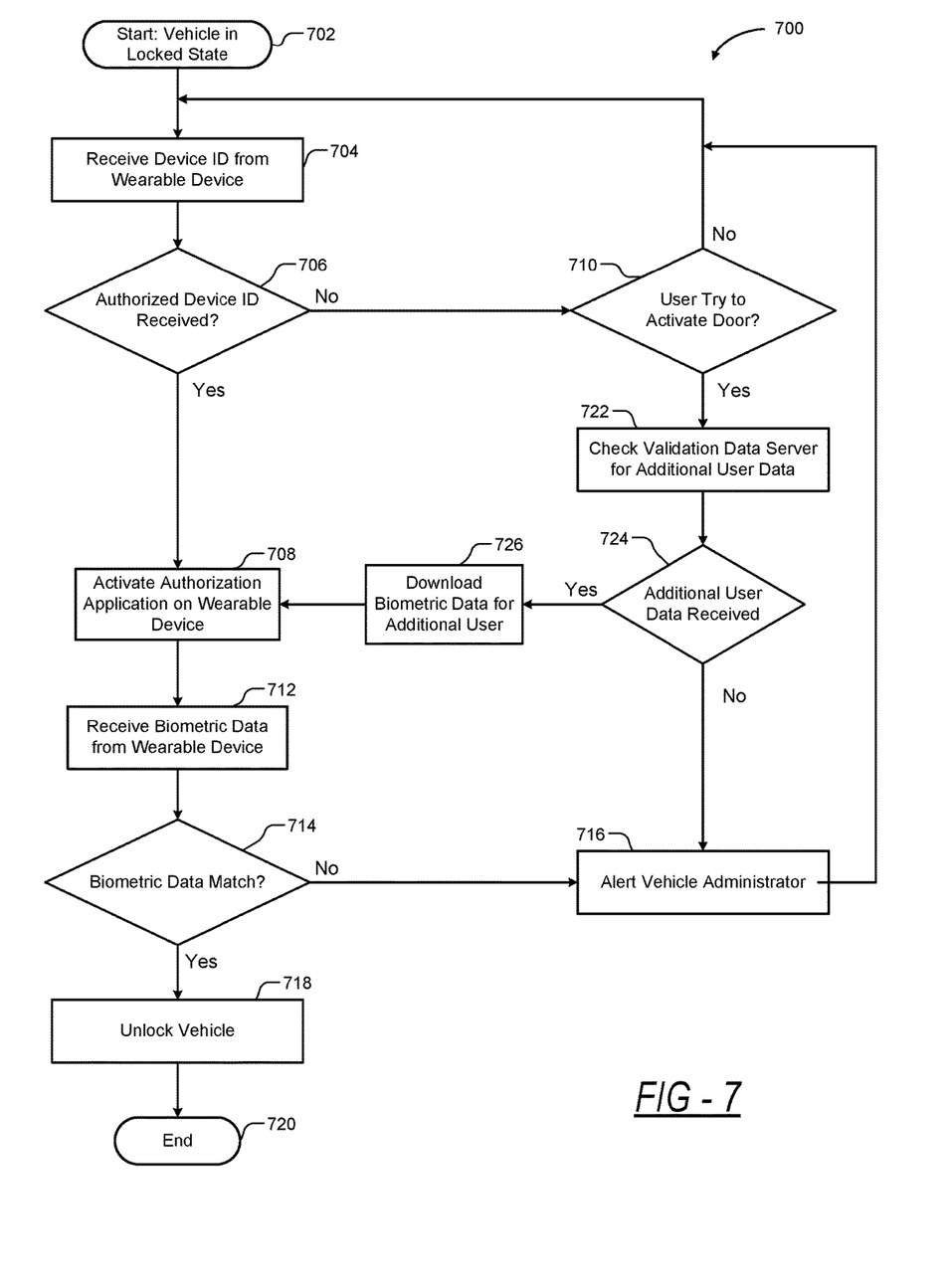
FIG. 7 illustrates a flow diagram for another method of multi-step vehicle entry authorization according to the present teachings.

FIG. 7 illustrates a flow diagram for another method of multi-step vehicle entry authorization according to the present teachings. The method or algorithm 700 shown in FIG. 7 is similar to the algorithm 600 shown in FIG. 6, except that the algorithm shown in FIG. 7 is for a wearable device 51 that includes a biometric sensor 58, as shown in FIG. 3. As such, when using the algorithm shown in FIG. 7, it is not necessary for the subject vehicle 10 to have a biometric sensor 20. Rather, biometric data of the user can be received by the biometric sensor 58 of the wearable device 51 and communicated to the subject vehicle 10 by the control module 52 and communication module 56 of the wearable device 51.

The algorithm 700 starts at 702 with the vehicle in a locked state. At 704, the control module 26 receives a device ID from a wearable device 51 through the proximity/contact sensor 24. At 706, the control module 26 checks the user database 32 of the subject vehicle 10 to determine whether the received device ID is associated with an authorized device, i.e., whether the device ID is stored in the user database 32 associated with authorized user information. When the device ID is authorized, the control module 26 proceeds to 708. When the device ID is not authorized, the control module 26 proceeds to 710.

At 708, the control module 26 activates an authorization application on the wearable device 51. For example, the authorization application may be executed by the control module 52 of the wearable device 51 and may include activating the biometric sensor 58 on the wearable device 51 and receiving biometric data from the user via the biometric sensor 58. For example, the control module 52 of the wearable device 51 can turn on the biometric sensor 58 and activate a backlight or framing light of the biometric sensor 58. At 712, the control module 26 of the subject vehicle receives biometric data of the use from the wearable device 51. For example, the wearable device 51 may communicate the biometric data of the user received from the biometric sensor 58 to the subject vehicle with the control module 52 and communication module 56. As discussed above, the biometric sensor 58 can include a fingerprint panel, in which fingerprint data of the user is received at 712. Alternatively, the biometric sensor 58 can include a microphone that receives voice input from the user, in which case voice data of the user is received at 712. For example, the voice data may include a recording of the user speaking a predetermined word or a word that the subject vehicle 10 and/or the wearable device 51 instructs the user to say. Alternatively, the biometric sensor 58 can include an image sensor or camera that receives image data of an iris of the user, in which case image data for an iris of the user is received at 712. Once the biometric data is received by the control module 26 of the subject vehicle 10 from the wearable device 51, the control module proceeds to 714.

At 714, the control module 26 compares the biometric data received from the user via the biometric sensor 58 of the wearable device 51 with stored biometric data. For example, the control module 26 can retrieve biometric data stored in the user database 32 as being associated with the previously received device ID.

At 714, when the inputted biometric data matches the stored biometric data, the control module 26 proceeds to 718 and unlocks the subject vehicle 10. For example, the control module 26 controls the door lock system 28 to unlock the doors of the subject vehicle. The algorithm then ends at 720.

At 714, when the inputted biometric data does not match the stored biometric data, the control module 26 proceeds to 716 and alerts a vehicle administrator associated with the subject vehicle 10 that an unauthorized user has attempted to enter the vehicle. For example, the vehicle administrator can be, for example, an owner of the subject vehicle 10 or a designated employee or owner of a business associated with the subject vehicle. The control module 26, for example, can alert the vehicle administrator by sending an email, a text message, and/or another suitable communication message to the vehicle administrator. After 716, the control module 26 then loops back to 704 and waits to receive another device ID from a wearable device 50.

Referring back to 706 of FIG. 7, as discussed above, the control module 26 checks the user database 32 of the subject vehicle 10 to determine whether the received device ID is associated with an authorized device, i.e., whether the device ID is stored in the user database 32 associated with authorized user information. When the device ID is not authorized, the control module 26 proceeds to 710.

At 710, the control module 26 determines whether the user tries to open/activate a door of the subject vehicle 10 after the device ID of the user's wearable device 50 is received, such as by pulling or lifting a door handle of the subject vehicle 10 or pressing a door activation button on the subject vehicle 10. Further, the control module 26 may determine whether the user tries to open/activate a door of the subject vehicle 10 within a predetermined time period, such as, for example, one minute or two minutes, after receiving the device ID. At 710, when the user does not try to open a door of the subject vehicle 10 after the device ID is received, the control module 26 loops back to 704 and waits for another device ID to be received from the proximity/contact sensor 24.

At 710, when the user does try to open a door of the subject vehicle, for example, within a predetermined time period after the device ID is received, the control module 26 proceeds to 722. At 722, the control module 26 communicates with the validation data server 42 through the communication module 30 and distributed communication network 40 to determine if additional user data is available for the subject vehicle 10. For example, an additional authorized user may have been added for the subject vehicle 10. In such case, a device ID for a wearable device and biometric data associated with the additional authorized user may be stored in the validation data server 42.

At 724, the control module 26 determines if there is additional user data available for the subject vehicle 10. If so, the control module 26 proceeds to 726 and downloads additional user data for the authorized user, including biometric data and a device ID associated with the authorized user. The control module 26 updates the user database 32 to include the additional user data. After retrieving the additional user data from the validation data server 42, the control module proceeds to 708 and activates the biometric sensor 20 and associated vehicle indicators, as discussed in detail above.

At 724 when additional user data is not available for the subject vehicle 10 in the validation data server 42, the control module 26 proceeds to 716 and alerts the vehicle administrator that an unauthorized user has attempted to enter the vehicle, as discussed in detail above. The control module 26 then loops back to 704 and waits to receive another device ID from a wearable device 50.

Figure 8:
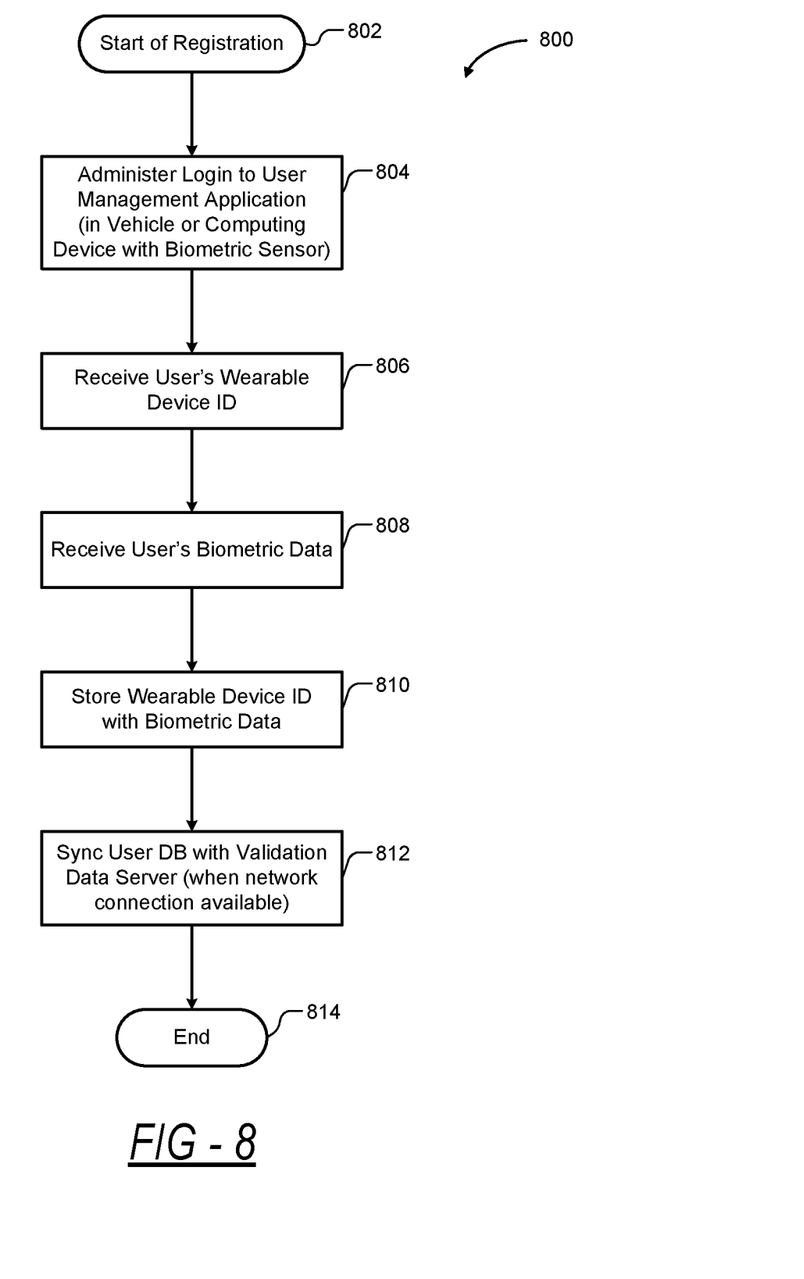
FIG. 8 illustrates a flow diagram for a method of updating data for a multi-step vehicle entry authorization system according to the present teachings.

FIG. 8 illustrates a flow diagram for a method of updating data for a multi-step vehicle entry authorization system according to the present teachings. The method or algorithm 800 can be performed by a computing device 44 in conjunction with the validation data server 42, as shown in FIG. 1. The computing device 44 can be a personal computer, laptop, or mobile computing device configured to receive biometric data of a user. Alternatively, the method or algorithm 800 can be performed by the control module 26 of the subject vehicle 10 in conjunction with the validation data server 42.

The algorithm starts at 802. At 804, a user login procedure is administered to a user management application running on the computing device 44 or on the control module 26 of the subject vehicle 10. The user login procedure may include, for example, entering a username and a password, or selecting a username and password if this is the first time the user login procedure is being used. In addition, if the algorithm 800 is being performed by a computing device 44, the user login procedure may include entering a vehicle identification of the subject vehicle 10 associated with the particular user. If the algorithm 800 is being performed with the control module 26 of the subject vehicle 10, the control module 26 will already have access to the vehicle identification and can retrieve the vehicle identification of the subject vehicle. The username, password, and vehicle identification are communicated to the validation data server 42.

At 806, a device ID of the user's wearable device is received by the computing device 44 or the control module 26 of the subject vehicle 10. At 808, the user's biometric data is received by a biometric sensor associated with the computer device 44, a biometric sensor 58 of the wearable device 51, or a biometric sensor 20 of the subject vehicle 10. For example, if fingerprint panel is being used as the biometric sensor, the computing device 44 or the control module 26 can receive fingerprint data of the user is received at 808. Alternatively, if a microphone is being used as the biometric sensor, the computing device 44 or the control module 26 can receive voice input from the user, in which case voice data, such as a recording of the user's voice of the user is received at 808. For example, the voice data may include a recording of the user speaking a predetermined word or a word that the computing device 44 or the subject vehicle 10 instructs the user to say. Alternatively, if an image sensor or camera is being used as the biometric sensor, the computing device 44 or the control module 26 receives image data of an iris of the user, in which case the image data for the iris of the user is received at 808.

At 810, the computing device 44 or the control module 26 of the subject vehicle 10 stores the biometric data of the user with the device ID of the wearable device 50, 51 associated with the user in the validation data server 42. For example, the validation data server 42 may include a validation database that stores user information, such as user login and password information, user biometric data, and a device ID associated with a wearable device 50, 51 of the user.

At 812, the newly entered user information, such as the device ID and associated biometric data for the user are synced from the validation data server 42 to the user database 32 of the subject vehicle 10. In the event the subject vehicle 10 does not currently have a network connection available to communicate with the validation data server 42, step 812 may be delayed until a network connection is available and the subject vehicle 10 is in communication with the validation data server 42. The algorithm 800 ends at 814.

In this way, the present disclosure beneficially provides systems and methods for multi-step vehicle entry authorization. As discussed above, to gain access to a subject vehicle 10 a user must have an authorized wearable device 50, 51 and must enter biometric data previously associated with a device ID of the wearable device 50, 51. In this way, the present disclosure provides for secure and authorized access to the subject vehicle 10 without the need for a traditional key fob. The present disclosure also beneficially provides a method for adding authorized users with associated wearable devices for a subject vehicle 10 so that multiple authorized users can appropriately gain access to the subject vehicle 10.

Additionally or alternatively, the multi-step vehicle entry authorization system may be configured to allow different user levels for different users. In such case, the user database 32 may store an access level associated with each user. For example, a first user access level may allow the user to enter a passenger compartment of the subject vehicle 10, but not to start or drive the subject vehicle 10. For example, the system may prevent the user from activating a starting system of the subject vehicle 10. A second user access level may allow the user to access a locked compartment of the subject vehicle 10, such as a trunk compartment or glove compartment of the subject vehicle 10, but not to start or drive the subject vehicle 10. A third user access level may allow the user to enter a passenger compartment of the subject vehicle 10 and to start and drive the subject vehicle 10, but not to access a locked compartment of the subject vehicle 10, such as a trunk compartment or glove compartment of the subject vehicle 10. A fourth user access level may allow the user to enter the passenger compartment of the subject vehicle 10, to start and drive the subject vehicle 10, and to access the locked compartments of the subject vehicle 10, such as the trunk compartment and/or glove compartment of the subject vehicle 10. In such case, when the inputted biometric data matches the previously stored biometric data, the control module 26 may check a user access level stored in the user database 32 associated with the particular user. Depending on the stored user access level associated with the particular user, the control module 26 may: (a) unlock the vehicle; (b) prevent or allow the user to access a locked compartment, such as a trunk compartment or glove compartment of the subject vehicle 10; and/or (c) prevent or allow the user from starting and driving the vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit."

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a proximity/contact sensor attached to a vehicle that receives a device ID from a wearable device of a user;
a biometric sensor that receives biometric data of the user;
a control module that accesses a user database storing authorized user information to retrieve stored biometric data associated with the received device ID and determines whether the user is authorized for the vehicle based on comparing the received biometric data of the user with the stored biometric data retrieved from the user database; and
wherein the control module unlocks the vehicle in response to a determination that the user is authorized for the vehicle.

2. The system of claim 1, wherein the biometric sensor includes a fingerprint panel that receives a fingerprint of the user and the authorized user information includes fingerprint data.

3. The system of claim 1, wherein the biometric sensor includes a microphone that receives voice input from the user and the authorized user information includes voice data.

4. The system of claim 1, wherein the biometric sensor includes a camera that receives an image of an iris of the user and the authorized user information includes iris image data.

5. The system of claim 1, wherein the biometric sensor is attached to the vehicle.

6. The system of claim 1, wherein the biometric sensor is attached to the wearable device and the biometric data is communicated to the control module by the wearable device.

7. The system of claim 1, wherein the control module accesses a validation data server and updates the user database based on additional authorized user information received from the validation data server.

8. The system of claim 1, wherein in response to (a) the received device ID not being found in the user database and (b) the user attempting to open a door of the vehicle, the control module accesses a validation data server to retrieve additional user information for the vehicle if available, and wherein the control module determines whether the user is authorized for the vehicle based on the device ID, the biometric data, and the additional user information.

9. The system of claim 1, wherein the control module determines whether the user is authorized for the vehicle by determining whether the received device ID matches a stored device ID in the user database and whether the received biometric data matches the stored biometric data in the user database.

10. The system of claim 1, wherein the control module determines a user access level associated with the user based on the device ID, the biometric data, and the user database, the user access level indicating whether the user is allowed to start the vehicle.

11. A method comprising:
receiving, with a proximity/contact sensor attached to a vehicle, a device ID from a wearable device of a user;
receiving, with a biometric sensor, biometric data of the user;
accessing, with a control module, a user database storing authorized user information to retrieve stored biometric data associated with the received device ID;
determining, with the control module, whether the user is authorized for the vehicle based on comparing the received biometric data of the user with the stored biometric data retrieved from the user database; and
unlocking, with the control module, the vehicle in response to a determination that the user is authorized for the vehicle.

12. The method of claim 11, wherein the biometric sensor includes a fingerprint panel that receives a fingerprint of the user and the authorized user information includes fingerprint data.

13. The method of claim 11, wherein the biometric sensor includes a microphone that receives voice input from the user and the authorized user information includes voice data.

14. The method of claim 11, wherein the biometric sensor includes a camera that receives an image of an iris of the user and the authorized user information includes iris image data.

15. The method of claim 11, wherein the biometric sensor is attached to the vehicle.

16. The method of claim 11, wherein the biometric sensor is attached to the wearable device and the biometric data is communicated to the control module by the wearable device.

17. The method of claim 11, further comprising:
accessing, with the control module, a validation data server; and
updating, with the control module, the user database based on additional authorized user information received from the validation data server.

18. The method of claim 11, further comprising accessing, with the control module, a validation data server to retrieve additional user information for the vehicle, if available, in response to (a) the received device ID not being found in the user database and (b) the user attempting to open a door of the vehicle, wherein the control module determines whether the user is authorized for the vehicle based on the device ID, the biometric data, and the additional user information.

19. The method of claim 11, wherein the control module determines whether the user is authorized for the vehicle by determining whether the received device ID matches a stored device ID in the user database and whether the received biometric data matches the stored biometric data in the user database.

20. A system comprising:
a proximity/contact sensor attached to a vehicle that receives a device ID from a computing device of a user, the computing device being one of a smartphone and embedded in the user;
a biometric sensor that receives biometric data of the user;
a control module that accesses a user database storing authorized user information to retrieve stored biometric data associated with the received device ID and determines whether the user is authorized for the vehicle based on comparing the received biometric data of the user with the stored biometric data retrieved from the user database; and wherein the control module unlocks the vehicle in response to a determination that the user is authorized for the vehicle.

* * * * *